Patented Aug. 19, 1941

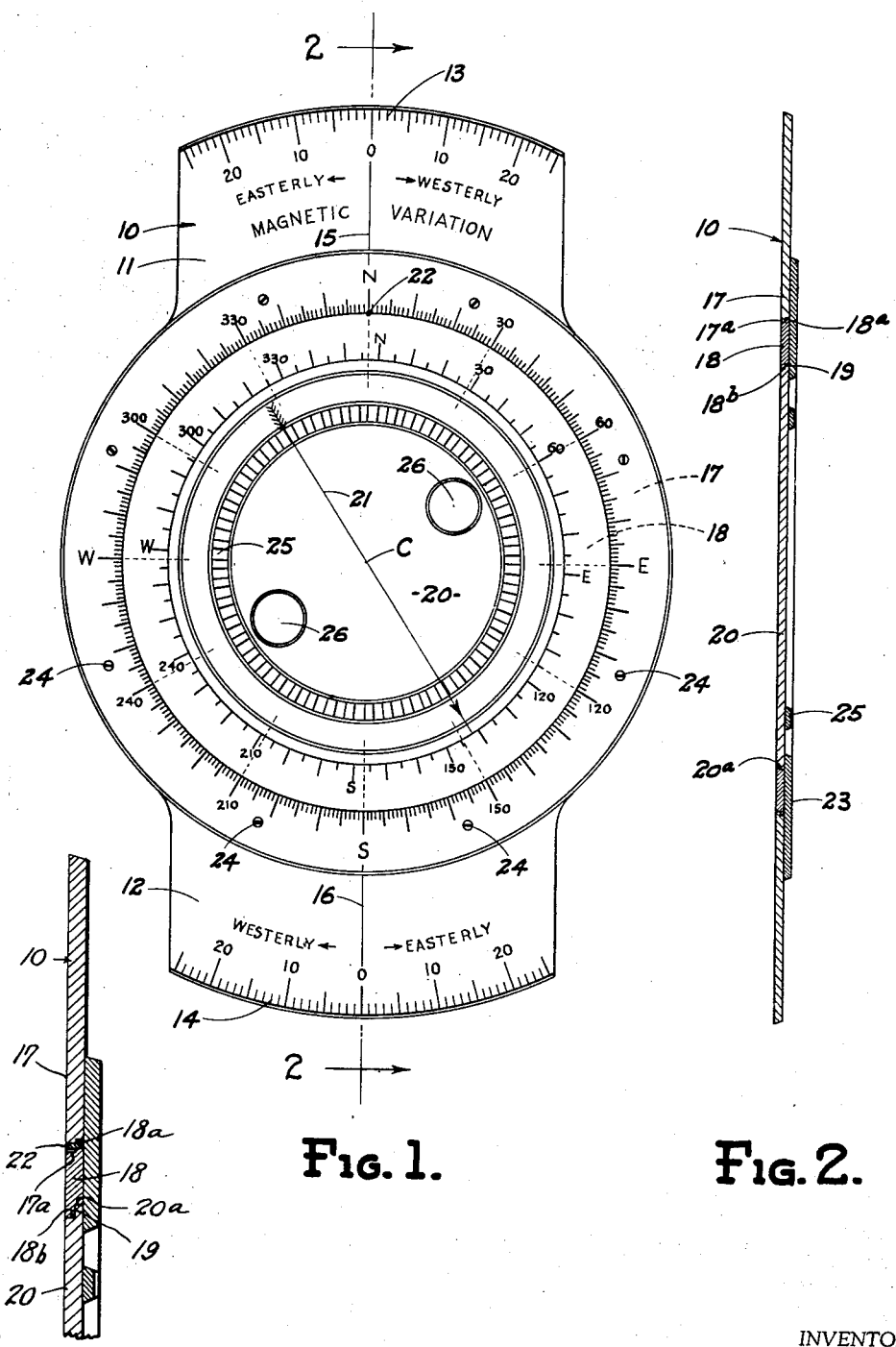

2,253,279

UNITED STATES PATENT OFFICE 2,253,279

NAVIGATING INSTRUMENT

Paul W. Loew, Chicago, Ill., assignor of one-half to Ernest R. Becker, Oak Park, Ill.

Application August 21, 1940, Serial No. 353,513

6 Claims. (Cl. 33—1)

This invention relates to navigating instruments, and more particularly to instruments which are designed for use with airplanes for the purpose of enabling the pilots to obtain conveniently and accurately the bearings, by their compasses, of their ports of destination. The instrument is designed with special reference to its adaptability to be applied to charts such as are employed by said pilots and which charts are provided with lines representing meridians of longitude and parallels of latitude, with lines also indicating and showing the variation of the magnetic needle, unaffected by deviation, from true north-and-south or meridian lines.

In the preferred embodiment of my invention, the instrument comprises a base member having widened opposed ends calibrated in degrees on both sides of a north-and-south line corresponding to the magnetic meridian to enable the instrument to be adjusted with reference to this variation at the place where the instrument is used; with an annulus formed with the said ends and connecting the same, the said annulus having north-and-south lines extending therefrom and registering with the north-and-south lines on the said extensions, the said annulus being calibrated, preferably in degrees, clockwise from the north indication thereon around the annulus and back to the said indication. The graduations on the annulus are equidistantly spaced and the annulus represents a true compass rose or ring, as unaffected by deviation. Within this annulus there is mounted a compass ring which is calibrated to correspond with the readings of the compass with which the particular airplane is equipped, said calibrations being ascertained by comparing the readings of the compass with which the plane is equipped with the corresponding readings on the compass rose above which the plane is pivoted with the center of its compass above the center of the rose. The compass ring thus shows the readings of the plane's compass, throughout the entire circle from the north point thereon clockwise around and back to the said north point, as said readings have been affected by the deviation for the plane in which the instrument is to be used, said deviation being caused by action of the metal parts of the plane upon the compass needle. This inner compass ring is secured within the first mentioned annulus with its north indication and calibrations arranged in proper relation to the calibrations on the outer annulus.

Mounted rotatably within the second annulus is a revolving course indicator bearing an arrow which is adapted, in a manner to be described hereinafter, to be employed with the chart and with the compass ring to indicate the compass course which the pilot or navigator is to steer in order to reach his destination. All of the parts as thus referred to are preferably made of plastic transparent material to enable the instrument to be placed upon and used in connection with a chart.

In the drawing forming part hereof, wherein the preferred form of my instrument is illustrated, Fig. 1 represents a plan view of the said instrument; Fig. 2 a central vertical sectional view of the said instrument; and Fig. 3 an enlarged detail in section illustrating the manner in which the parts of the instrument are assembled.

Describing by reference characters the various parts illustrated herein, 10 denotes the base generally, the said base being preferably formed of transparent material, as stated, and having opposed wide end extensions 11 and 12 each provided with a scale 13 and 14, respectively, graduated in degrees on opposite sides of a north-and-south line, 15 and 16, respectively, the said graduations being utilizable in order to enable the instrument to be adjusted on a chart in accordance with the variation at the place where the observation is taken.

17 denotes an annulus connecting and preferably integral with the ends 11 and 12, the inner edge and the outer periphery of the said annulus being concentric with the center C of said instrument. This annulus is provided with the letters N, E, S and W, representing the four cardinal points of the compass and is provided also with equidistantly spaced graduations extending clockwise around from N, through E, S and W, back to N, said graduations corresponding to degrees. The inner edge of the annulus 17 is provided with a rabbeted seat 17a which receives the rabbeted peripheral edge 18a of the compass ring 18, the inner edge 18b of the said compass ring being provided with a rabbeted seat 19 for the reception of the correspondingly rabbeted peripheral edge 20a of an inner revolving course indicator 20, said indicator being provided with a course-indicating arrow 21 extending diametrically thereacross, the center of said revolving course indicator being the center C with which the inner edge of the annulus 17 and the inner and outer edges of the compass ring 18 are concentric.

The compass ring 18 is also provided with the letters N, E, S and W representing the four cardinal points of the compass and is calibrated in degrees in a clockwise direction from N, through E, S and W, back to N. This compass ring, as previously explained, is calibrated for deviation of the compass with which the airplane is equipped, which deviation has been ascertained, in the case of an airplane, by swinging the airplane above a true compass rose in the manner described, said rose being represented by the annulus 17 and the calibrations thereon. The compass ring having been thus calibrated with respect to the compass rose, it is secured in operative relation to the annulus 17 with the north and south points thereon offset from the north and south points on the annulus 17 in accordance with the deviation of these points from the corresponding points on the true compass rose. As will be seen, the ring 18 is preferably secured in place by means of a pin 22 which extends through the overlapping portions of the ring 18 and the annulus 17, the pin making a driving fit within the holes which are provided for its reception in such overlapping portions. The holes for the reception of the pin are formed after the compass ring shall have been placed in proper position within the annulus, as pointed out above. In the instrument represented in the drawing herein, it will be seen that the north point on the compass ring is approximately 3° east of the true magnetic north, but that the 60° calibration of this compass ring is in substantial register with the correspondingly designated calibration on the annulus. As will be seen, also, the designation E on the compass ring is spaced about 2° to the right or toward the south from the corresponding designation on the annulus 17; while the 120° designation on the compass ring is spaced about 5° to the right or toward the south from the corresponding designation on the annulus; and the relative positions of the other corresponding graduations on the annulus 17 and compass ring 18 are shown in the drawing.

The compass ring and the revolving course indicator are held in proper position with reference to each other and also with reference to the annulus 17 by means of a transparent cover plate 23, which is applied to the compass ring and the annulus after the compass ring shall have been secured by the pin 22 in its proper relation to the annulus, and which is secured to the base and to the annular portion thereof by screws 24, and the course indicator is provided with a knurled ring 25 as well as with finger openings 26 providing means for rotating the same within the compass ring.

By the manner of constructing and uniting the parts of my instrument, the bottom surfaces of said parts will be in a common plane, thereby facilitating its use in connection with a map or chart.

With the parts arranged as described, the instrument will be used in the following manner: assuming that it is desired to ascertain the proper compass course to be steered, for instance, between Des Moines and Ottumwa, Iowa, a line connecting these points has been or will be drawn upon the chart and the instrument will be applied to a meridian about midway between the said cities, with the center C of the course indicator positioned at the intersection of the meridian and the said line. The instrument will be so adjusted as to bring upon the meridian the calibration upon either extension 11 or 12 which corresponds to the variation which is indicated upon the chart at said meridian. The course indicator is then rotated to bring the arrow in register with the line joining the points of departure and arrival, and the course to be steered by the airplane compass will be read upon the compass ring.

It will be evident that my instrument may be used with vessels navigating waterways as well as with vessels navigating the skyways. The compass ring will be calibrated for deviation by the well-known procedure of "swinging ship" about a substantially vertical pivot, taking observations of the compass needle during successive positions of the vessel and comparing these readings with the corresponding reading of the needle of a standard compass.

The instrument constructed in accordance with my invention is simple and inexpensive of production but is extremely convenient and efficient in operation.

Having thus described my invention, what I claim is:

1. A navigating instrument for vessels comprising in combination an inner circular rotatable course indicator having a radial course indicating line extending toward the periphery thereof, a compass ring graduated in accordance with the successive positions which the compass needle of the vessel with which the instrument is to be used will assume with reference to the graduations on a true compass ring when the vessel is swung or rotated about a substantially vertical pivot, the said ring surrounding the said course indicator, an annulus surrounding the compass ring and graduated to represent a true magnetic compass card, and an extension of the said annulus having a north-and-south indication registering with a north-and-south indication on the annulus and provided with variation-indicating graduations extending on opposite sides from its north-and-south indication, and means securing the compass ring to and within the annulus with its north point in the relation to the north point on the said annulus as determined by swinging the vessel about said pivot, the course indicator, the compass ring, the annulus and the extension being of transparent material.

2. In the instrument set forth in claim 1, the graduations on the extension and the graduations on the portion of the annulus within the graduated portion of said extension being in radial alinement.

3. A navigating instrument for vessels comprising in combination an inner circular rotatable course indicator having a radial course-indicating line extending toward the periphery thereof, a compass ring surrounding the said course indicator and graduated in accordance with the successive positions which the compass needle of the vessel with which the instrument is to be used will assume with reference to the graduations on a true compass ring when the vessel is swung or rotated about a substantially vertical pivot, an annulus surrounding the compass ring and graduated to represent a true magnetic compass card, opposed extensions of said annulus each having a north-and-south indication registering with a north-and-south indication on said annulus and each provided with variation-indicating graduations extending in opposite directions from its north-and-south indications on the extensions, and the graduations on the portions of the annulus within the graduated portions of said extensions being in radial alinement, and means securing the compass ring within the annulus with its north point in the relation to the north point on the annulus as determined by swinging the vessel about said pivot, the course indicator, the compass ring, the annulus and the extensions being of transparent material.

4. In the instrument set forth in claim 3, the compass ring being mounted within a rabbeted seat provided therefor in the inner edge of the annulus and the course indicator being mounted within a rabbeted seat provided therefor in the inner edge of the compass ring, and a transparent cover plate extending across the compass ring and the outer portion of the course indicator and substantially across the annulus and secured to said annulus.

5. In the navigating instrument set forth in claim 3, the annulus and the extensions being formed on a common base member.

6. A navigating instrument for vessels comprising in combination a compass ring graduated in accordance with the successive positions which the compass needle of the vessel with which the instrument is to be used will assume with reference to the graduations on a true compass ring when the vessel is swung or rotated about a substantially vertical pivot, an annulus surrounding the compass ring and graduated to represent a true magnetic compass card, and an extension of the said annulus having a north-and-south indication registering with a north-and-south indication on the annulus and provided with variation-indicating graduations extending on opposite sides from its north-and-south indication, the north point of the compass being placed in the relation to the north point on the said annulus as determined by swinging the vessel about the said pivot, the instrument being made of transparent material and the portion within the compass ring being provided with a point forming a common center for the compass ring and the said annulus.

PAUL W. LOEW.